(12) United States Patent
Slack

(10) Patent No.: US 9,498,917 B2
(45) Date of Patent: Nov. 22, 2016

(54) METHOD OF FORMING A CONTAINER

(71) Applicant: 3 Boys Limited, Woodbridge, Suffolk (GB)

(72) Inventor: Henry William Slack, London (GB)

(73) Assignee: 3 Boys Limited, Ipswich (GB)

( * ) Notice: Subject to any disclaimer, the term of this patent is extended or adjusted under 35 U.S.C. 154(b) by 0 days.

(21) Appl. No.: 14/760,294

(22) PCT Filed: Jan. 10, 2014

(86) PCT No.: PCT/GB2014/050070
§ 371 (c)(1),
(2) Date: Jul. 10, 2015

(87) PCT Pub. No.: WO2014/108696
PCT Pub. Date: Jul. 17, 2014

(65) Prior Publication Data
US 2015/0353235 A1    Dec. 10, 2015

(30) Foreign Application Priority Data

Jan. 11, 2013  (GB) .................................. 1300519.4

(51) Int. Cl.
| | |
|---|---|
| *B32B 37/00* | (2006.01) |
| *B29C 57/00* | (2006.01) |
| *B29C 65/74* | (2006.01) |
| *B29C 63/34* | (2006.01) |
| *B65D 25/14* | (2006.01) |
| *B29L 31/00* | (2006.01) |

(52) U.S. Cl.
CPC ........... *B29C 57/005* (2013.01); *B29C 63/346* (2013.01); *B29C 65/74* (2013.01); *B65D 25/14* (2013.01); *B29L 2031/712* (2013.01); *Y10T 156/10* (2015.01); *Y10T 156/108* (2015.01); *Y10T 156/1052* (2015.01); *Y10T 156/12* (2015.01)

(58) Field of Classification Search
CPC ... B29C 57/005; B29C 63/346; B29C 65/74; B65D 25/14
USPC ................ 156/189, 198, 202, 203, 218, 443
See application file for complete search history.

(56) References Cited

U.S. PATENT DOCUMENTS 3,468,226 A    9/1969  England et al.
3,967,991 A *  7/1976  Shimano ................. B29C 43/02
                                                    156/189

FOREIGN PATENT DOCUMENTS

GB    1435217       5/1976
GB    2492828 A     1/2013

* cited by examiner

*Primary Examiner* — James Sells
(74) *Attorney, Agent, or Firm* — Hayes Soloway, P.C.

(57) ABSTRACT

This invention relates to a method of making a container having a separable inner lining and outer shell, and in particular to a method of forming a flexible lining for a container. This invention also relates to apparatus for use in such methods. A method of forming a flexible lining for a container comprises providing a former having a substantially flat end face and a perimeter surface extending from the end face, the former having external shape and dimensions substantially the same as the internal shape and dimensions of the container, forming a sleeve of plastics material around the perimeter surface of the former, an edge region of the sleeve extending beyond the end face of the former, heating the edge region to substantially conform the edge region to an edge portion of the end face of the former, and bonding a sheet of plastics material to the conformed edge region of the sleeve to form a base of the lining.

11 Claims, 7 Drawing Sheets

METHOD OF FORMING A CONTAINER

BACKGROUND a. Field of the Invention

This invention relates to a method of making a container having a separable inner lining and outer shell, and in particular to methods of forming a flexible lining for a container and methods of lining a container with a pre-formed lining. This invention also relates to apparatus for use in such methods.

b. Related Art

There is a general desire and need to reduce the amount of waste that is produced and a drive to recycle as much as possible. One particular area that is receiving much attention is packaging.

One sector of interest is disposable or paper cups. These are often made from pre-laminated card which is then rolled and formed to create a disposable cup. The use of laminated card can have the benefits of being more resource and energy efficient than using plastic alone, however, combining materials in this way prevents the cups being recycled with unlaminated cardboard or pure plastic, and therefore, most disposable cups end up in landfill.

Typically the laminated card comprises a paper-based substrate layer and a polymeric coating, which in the case of disposable cup is usually polyethylene. The coating is waterproof and acts as a liquid barrier between the contents of the cup and the paper-based substrate. Generally, the laminated card has a polymeric or plastics coating on only one side of the substrate when used to form cups to hold hot beverages, whereas the laminated card will often have a plastics coating on both sides of the paper-based substrate when used to form cups to hold cold beverages.

However, these coatings prevent the material from fully decomposing. In particular, during the recycling process typically used for paper products, the plastics coating prevents or inhibits water breaking up the paper fibres of the substrate during the process of pulping. Additionally, the plastics coating is difficult to separate and therefore contaminates the paper pulp that is formed.

Of note is the fact that an estimated 58 billion paper cups end up in landfill every year in the USA, and this equates to several million trees being felled annually, as most of the paper-based material used to form the cups is virgin, non-recycled material.

There is, therefore, a need to find a more environmentally friendly alternative. However, commercial considerations mean that it is desirable for any alternative to be able to be manufactured at similar speeds and in similar volumes to existing paper cups and also with the same degree of reliability and consistency. Current paper cup making machines typically output at a rate of up to 100-200 cups per minute with a failure/leakage rate of about one cup in every million.

Containers substantially similar to disposable cups are also increasingly used to contain other foodstuffs, such as yogurt and ice-cream. In these applications it is necessary for the container to be able to store the contents of the container for a desired length of time, and also be able to withstand a consumer removing the contents of the container with a suitable implement such as a spoon. It is necessary, therefore, for the container to be able to withstand scraping along its base and side wall without a reduction in integrity.

It is an object of the present invention to provide a method of manufacturing a container that overcomes the above-mentioned problems.

SUMMARY OF THE INVENTION

According to a first aspect of the present invention there is provided a method of forming a flexible lining for a container, the method comprising:

providing a former having a substantially flat end face and a perimeter surface extending from the end face, the former having external shape and dimensions substantially the same as the internal shape and dimensions of said container;

forming a sleeve of plastics material around the perimeter surface of the former, an edge region of the sleeve extending beyond the end face of the former;

heating said edge region to substantially conform the edge region to an edge portion of the end face of the former; and bonding a sheet of plastics material to said conformed edge region of the sleeve to form a base of the lining.

This method of forming the lining has the advantage that the lining conforms exactly to the internal shape of the container to be lined so that it is not necessary to stretch the lining to insert it into the container. In particular it is not necessary to stretch the lining to conform it to lower corners or edges of the container. In this way, the thickness of the lining remains substantially constant over the whole area of the lining within the container and the lining is less prone to tearing. Furthermore, the lining can contact the internal surfaces of the container smoothly with no wrinkles or creases.

According to a second aspect of the present invention there is provided an apparatus for forming a flexible lining for a container, the apparatus comprising:

a former around which the lining is formed, the former having a substantially flat end face and a perimeter surface extending from the end face, and the former having external shape and dimensions substantially the same as the internal shape and dimensions of said container;

means for forming a sheet of plastics material around the perimeter surface of the former, to form a sleeve around the former, an edge region of the sleeve extending beyond the end face of the former;

heating means arranged to heat said edge region to substantially conform it to an edge portion of the end face of the former; and bonding means arranged to bond a sheet of plastics material to said conformed edge region of the sleeve to form a base of the lining.

In a first particular embodiment of the invention, the step of forming a sleeve comprises wrapping a first sheet of plastics material around a first part of the perimeter surface of the former, wrapping a second sheet of plastics material around a second part of the perimeter surface of the former, and bonding the first and second sheets together to form a sleeve around the perimeter surface of the former. The method preferably further comprises, after bonding the first and second sheets together to form a sleeve, the step of cutting the first and second sheets of plastics material adjacent to said bond to remove excess plastics material from the sleeve. This allows the method to be carried out continuously, with the sheets of plastics material being provided from rolls of plastics material.

In a second particular embodiment of the invention the method comprises cutting a blank from a sheet of plastics material, wrapping said blank around the perimeter surface of the former so that edges of the blank overlap, and bonding said overlapping edges to form the sleeve around the former.

Preferably the step of cutting the blank comprises die cutting said blank. This method may be more suited to containers having a non-circular cross-sectional shape than the method of the first specific embodiment, as the means required to manipulate the single sheet of plastics material may be less complex than the means required to manipulate and grip the two sheets of plastics material.

In the apparatus used to carry out this preferred method, the means for forming a sheet of plastics material around the perimeter surface of the former of the apparatus preferably comprises cutting means for cutting a blank from a film of plastics material, manipulating means for wrapping said blank around the perimeter surface of the former so that edges of the blank overlap, and bonding means for bonding said overlapping edges to form the sleeve around the former.

In preferred embodiments of the invention the step of bonding a sheet of plastics material to the conformed edge region of the sleeve comprises heat welding said sheet of plastics material. As such, the bonding means of a preferred apparatus comprises heat welding means.

To permit this part of the method to be carried out as a continuous process, the sheet of plastics material used to form the base is, typically, provided from a roll of material. As such, it is desirable if the method further comprises, after the step of bonding a sheet of plastics material to the conformed edge region of the sleeve, the step of cutting said sheet so that a perimeter shape of the sheet is substantially the same as a perimeter shape of the end face of the former. As such, a preferred embodiment of the apparatus further comprises cutting means for cutting said sheet of plastics material to form a base of the lining, the cutting means arranged, in use, to cut said sheet so that a perimeter shape of the sheet is substantially the same as a perimeter shape of the end face of the former.

In alternative embodiments a piece of sheet plastics material may be cut from a roll before the sheet is bonded to the conformed edge region. In these embodiments it is, however, likely to be necessary to provide means for aligning the cut sheet with the end face of the former.

According to a third aspect of the present invention there is provided a method of lining a container with a pre-formed flexible plastics lining, the container having an opening and a rim extending around the opening and at least a part of the lining substantially conforming to an internal shape of the container, the method comprising:
  inserting the lining into the container so that a first part of the lining is in contact with internal surfaces of the container and a second part of the lining protrudes from the opening of the container;
  adhering the first part of the lining to the internal surfaces of the container;
  adhering a tab to an external surface of the container so that a first part of the tab is adhered to the surface and a second part of the tab is not adhered to the surface, the adherence between the first part of the tab and the container being such that the tab can subsequently be peeled and separated from the external surface;
  conforming the second part of the lining to the external surface of the container such that the second part of the lining at least partially covers the first part of the tab.

The pre-formed flexible lining is preferably manufactured using the method according to the first aspect of the present invention.

In preferred applications of this invention the container is made from paperboard. In particular, the container may be in the form of a paper cup.

Also, according to a fourth aspect of the invention there is provided an apparatus for lining a container with a pre-formed flexible plastics lining, the container having an opening and a rim extending around the opening and at least a part of the lining substantially conforming to an internal shape of the container, the apparatus comprising:
  means for inserting the lining into the container so that a first part of the lining is in contact with internal surfaces of the container and a second part of the lining protrudes from the opening of the container;
  means for adhering the first part of the lining to the internal surfaces of the container;
  means for adhering a tab to an external surface of the container so that a first part of the tab is adhered to the surface and a second part is not adhered to the surface, the adherence between the first part of the tab and the container being such that the tab can subsequently be peeled and separated from the external surface;
  means for conforming the second part of the lining to the external surface of the container such that the second part of the lining at least partially covers the first part of the tab.

In a preferred embodiment the method further comprises forming a region of weakness in the second part of the lining, and the associated apparatus further comprises means for forming a region of weakness in the second part of the lining. In some embodiments the region of weakness may include a nick in the edge of the lining or a thinned portion of the lining. In preferred embodiments the region of weakness comprises a line of perforations. Accordingly, in associated apparatus, the means for forming a region of weakness comprises perforating means for perforating the lining.

The line of perforations may extend from an edge of the second part of the lining towards the rim of the container. Alternatively, the line of perforations may extend circumferentially around a part of the circumference of the container.

the perforating means is arranged to form a line of perforations extending circumferentially around the container.

In some embodiments it may be beneficial to provide a first line of perforations extending circumferentially around the container and a second line of perforations extending between the edge of the second part of the lining and the first line of perforations.

It will be appreciated that this method is applicable to containers having various cross-sectional shapes. As such, references to circumferentially extending perforations should be interpreted to mean that the line of perforations extends around at least a part of the perimeter of the container. The line of perforations will typically extend in a direction substantially parallel to a plane containing the rim of the container.

In embodiments in which the container has a curved side wall and the line of perforations extends circumferentially around the container, the perforating means used to form this line of perforations preferably comprises a concave, castellated cutting edge.

It is advantageous if the internal surfaces of the container are pre-coated with a heat activated adhesive before the lining is inserted. In these embodiments, the step of adhering the first part of the lining to the internal surfaces of the container comprises heating said adhesive to a temperature at which the adhesive becomes tacky. In a particularly preferred embodiment in which the container is made of paperboard, the heat activated adhesive is pre-applied to a surface of the paperboard before the container is formed.

The use of a heat activated adhesive is particularly advantageous because the lining may be inserted into the container with the adhesive in a non-tacky state and then, once the lining has been correctly positioned, the adhesive can be activated to become tacky and retain the lining in position.

In preferred embodiments of the invention, prior to adhering the tab to the container, the method further comprises the steps of detecting an orientation of the container, and rotating the container through a pre-determined angle about an axis normal to a base of the container. These method steps allow the tab to be applied in the same position on the container each time the method is carried out. This is of particular benefit if the container has been printed with graphics or text. The associated apparatus, therefore, preferably further comprises means for carrying out these method steps.

To conform the second part of the lining to the external surface of the container the method of the present invention preferably comprises heat shrinking said second part of the lining. As such, the associated apparatus preferably includes heating means to heat shrink said second part of the lining.

According to a fifth aspect of the present invention there is provided a tool for forming a lining over a rim of a container, the rim surrounding an opening of the container, the tool comprising:
engaging means for engaging with said lining, the engaging means having at least two portions movable relative to each other, the engaging means having an outer perimeter and an inner perimeter, and the engaging means extending around an axis of the tool;
means for moving the portions relative to each other between a first position and a second position, the resulting inner and outer perimeters of the engaging means being longer when the portions are in the second position than when the portions are in the first position; and
means for moving the engaging means in a direction parallel to the axis,
wherein, in use, when the portions are in the first position the outer perimeter is shorter than an inner perimeter of the rim of said container, and when the portions are in the second position the inner perimeter is longer than an outer perimeter of the rim of said container.

The engaging means may comprise distinct segments or, alternatively, may comprise a coiled member or expandable ring.

In preferred embodiments the engaging means comprises at least two separate segments, inner surfaces of said segments defining at least a part of the inner perimeter of the engaging means and outer surfaces of said segments defining at least a part of the outer perimeter of the engaging means.

In embodiments, for example, in which the container has a generally circular or oval cross-sectional shape, each of said segments preferably comprises a convex outer surface and a concave inner surface.

Adjacent segments may be in touching contact with each other when said segments are in the first position; a space between adjacent segments increasing in length as the segments are moved to the second position.

According to a sixth aspect of the present invention there is provided a method of folding a lining over a rim of a container using a tool according to the fifth aspect of the invention, the method comprising:
inserting a flexible lining into a container so that a first part of the lining is within the container and a second part of the lining protrudes from an opening of the container, said rim surrounding the opening;
adhering the first part of the lining to internal surfaces of the container;
positioning the engaging means, with the portions in the first position, so that at least part of the engaging means is surrounded by the second part of the lining;
moving the portions of the engaging means from the first position to the second position, to increase the length of the outer perimeter of the engaging means such that the engaging means engages with the second part of the lining;
when the portions of the engaging means are in the second position, moving the engaging means in a direction parallel to the axis of the tool so that the engaging means passes around the outside of the rim of the container to wrap the second part of the lining over the rim of the container.

Typically, moving the portions of the engaging means from the first position to the second position causes the engaging means to engage with and stretch the second part of the lining.

BRIEF DESCRIPTION OF THE DRAWINGS

The invention will now be further described, by way of example only and with reference to the accompanying drawings, in which.

DETAILED DESCRIPTION

Figure 2:
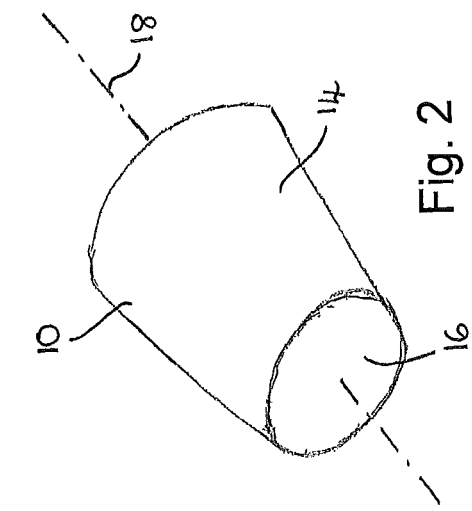
FIG. 2 shows a former used to manufacture the lining.

The method of manufacturing a container according to the present invention comprises a first part in which a lining of the container is formed from a flexible sheet of plastics material and a second part in which the pre-formed lining is inserted into an outer shell made of paperboard so as to form a complete container.

In the first part of the method the lining is formed to conform to an internal shape of the outer shell. In particular, an external shape and size of at least a part of the lining is substantially the same as an internal shape and size of the shell.

As such, when the lining is inserted into the shell in the second part of the method, an external surface of the lining is brought into contact with the internal surface of the shell over substantially the complete area of the base and side wall of the shell. In preferred embodiments of the invention, the internal surfaces of the shell are pre-coated with an adhesive to adhere the lining to the shell. The combination of the conformation of the lining to the shell and the adherence of the lining to the shell means that the lining is applied smoothly to the internal surfaces of the shell so that no creases or air bubbles remain between the shell and the lining.

Importantly, although the adherence of the lining to the shell retains the lining in contact with the shell during use of the container, the peel strength of the adhesive is such that the plastics lining may be separated from the paperboard shell after use to facilitate separate disposal and recycling of the two components.

To enable a user to easily peel apart the lining and shell, a portion of the lining is wrapped over a rim of the shell and conformed to an external surface of the shell. Means are provided in this portion of the lining to enable a user to easily separate the lining from the external surface of the shell and continue to peel the rest of the lining away from the internal surface of the shell whilst keeping the lining intact.

Wrapping the lining over the rim of the shell also provides a surface onto which a plastic film lid may be welded in a subsequent step if, for example, the container is to be filled with a foodstuff. In other embodiments, the conformation of the lining to the rim and external surface of the shell provides a sealing surface for a re-sealable lid, such as those currently used with disposable coffee cups.

The first and second parts of the method of manufacturing a container will now be described more fully with reference to a number of preferred embodiments. It will be appreciated that in the following description, references to up, down, upper, lower, and similar directional terms are to be interpreted as being relative to the orientation of the shell, which comprises an upper edge including a rim around an opening and a lower edge defined around a base of the shell.

Manufacture of a Lining

A first preferred embodiment of the method of manufacturing the lining is illustrated in FIGS. 1 to 7. In this example, a plurality of linings are cut and formed from thin sheets or films 1 of plastics material. The films 1 are continuous lengths of plastics material and are preferably stored in rolls before use. The films are formed by extrusion so that the polymer chains within the plastics materials are aligned generally along the length of the film. The width of the film 1 used to form the lining is greater than the height of the container to be lined.

In a first stage of the process the film 1 is drawn, under tension, across cutting means 2. The cutting means 2 comprise two knife blades 2 spaced apart in a direction perpendicular to the length of the film 1. The knife blades 2 intermittently engage with the film 1 to form two lines of discontinuous slits 4 along the length of the film 1. The two knife blades 2 engage with and cut the film 1 at the same time so that a slit 4 in each of the lines form a pair of slits that are aligned across the width of the film.

The lines of slits 4 are parallel to side edges 6 of the film 1 and define a border region 8 of the film 1 between each of the lines of slits 4 and a respective, adjacent side edge 6. The distance between the two slits 4 in a pair is greater than the height of the container to be lined, and additionally the length of each of the slits 4 is slightly longer than half the largest circumference of the container.

In a second stage of the process two pre-slit films 1 are drawn around a former 10 and bonded together to create a sleeve 12. The former 10 has an external shape and external dimensions substantially the same as the internal dimensions of the shell or container to be lined. In this example the former 10 is in the shape of a truncated cone such that the former 10 has a tapering side wall 14 and flat end face 16. The angle of taper of the side wall 14 is the same as the angle of slope of the side wall of the container to be lined and the flat end face 16 is perpendicular to an axis 18 of the former 10 and corresponds in size and shape to the internal base of the container.

The two films 1 are pulled, under tension, around opposing sides of the former 10 and then movement of the films 1 is halted by means of a braking mechanism (not shown) at a point at which a pair of slits 4 in each film 1 is aligned with the former 10. In this example, the braking mechanism comprises gripping means, located between the cutting means 2 and the former 10, that engage with and hold each of the films 1 independently of each other.

Once the gripping means is engaged to grip the films 1, the tension on the films is released. A first clamping means 20 clamps the two films 1 together at a rearward side of the former 10 in relation to the direction of movement of the films 1, and then a second clamping means 22 clamps the two films 1 together at an opposing, forward side of the former 10. It is necessary to release the tension on the films 1 at this stage to allow a length of each of the films 1 to be drawn backwards to enable the films 1 to be wrapped fully around and in contact with the side wall 14 of the former 10.

A first pair of bonding means 24 bonds the two films 1 together at both the frontward and rearward sides of the former 10, along the full length of the former, so that the bonded films form a complete sleeve 12 around the former 10. In this embodiment the bonding means 24 comprises heating means, in the form of an elongate slender heating element, to heat weld the two films 1 together.

Cutting means 26, in the form of a pair of cutting blades 26, are arranged to cut through the two films radially outwards of the bonds to separate the sleeve 12 from the remainder of the film 1. In particular, each cutting means 26 is located next to the first bonding means 24 on either side of the former 10, so that the cutting means 26 are positioned radially outwards of the bonding means 24 and the bonding means are thereby positioned between the former and the cutting means.

Figure 4:
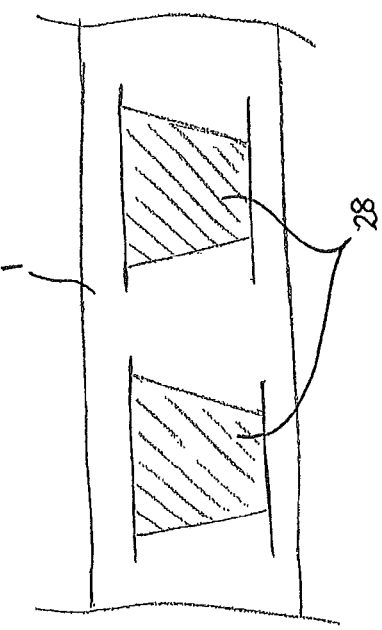
FIG. 4 illustrates the waste sheets of plastics material remaining after the sleeves have been formed.
Figure 1:
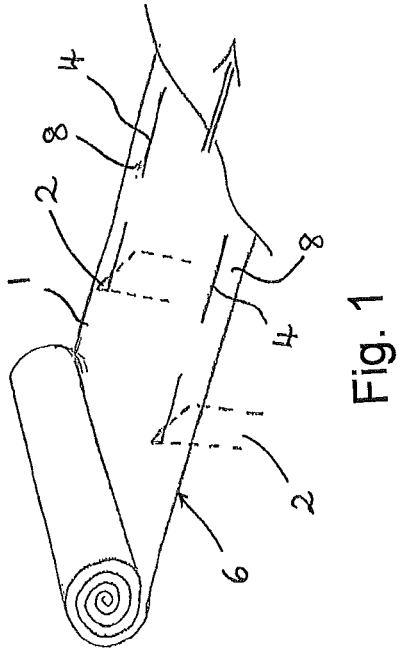
FIG. 1 illustrates a first stage in a first embodiment of a method of manufacture of a lining for a container, the lining being made from sheets or films of plastics material.

Each cutting blade 26, extends parallel to the adjacent portion of the side wall 14 of the former 10. The length of the cutting blade 26 is such that the resultant cuts extend across the film 1 between the slits 4, but do not extend across the full width of the film 1. As such, the border regions 8 of the film 1, between the slits 4 and the edge of the film, remain intact and the excess plastics material remains as a continuous length of waste film 1. As illustrated in FIG. 4, the waste film 1 comprises a series of apertures 28 created by the removal of portions of film to form the sleeves 12 around the former 10.

In this example, a second pair of bonding means 30 is positioned radially outwards of the cutting means 26. Preferably the second bonding means 30 comprises heating means to heat weld the two films 1 together. The position of the second bonding means 30 relative to the cutting means 26 is such that the second bonding means 30 welds together the waste film 1 proximate an edge of the aperture 28. This means that the two films 1 remain joined together after the sleeve 12 has been formed and cut from the films 1. This enables the waste film 1 to be more easily wound onto a roll for disposal or recycling.

In this embodiment the clamping means 20,22 are in the form of blade members 20,22 that are pivotally mounted so as to be moveable between a disengaged position remote from the former 10 and an engaged position in which the films 1 are clamped together around the former 10. In the engaged position, a side of each of the blade members is located adjacent to the side wall 14 of the former 10 with a single film 1 extending through a gap between the side of the blade member 20,22 and the side wall 14 of the former 10. In this way, the blade member 20,22 retains the film 1 tightly against the side wall of the former 10.

Figure 3:
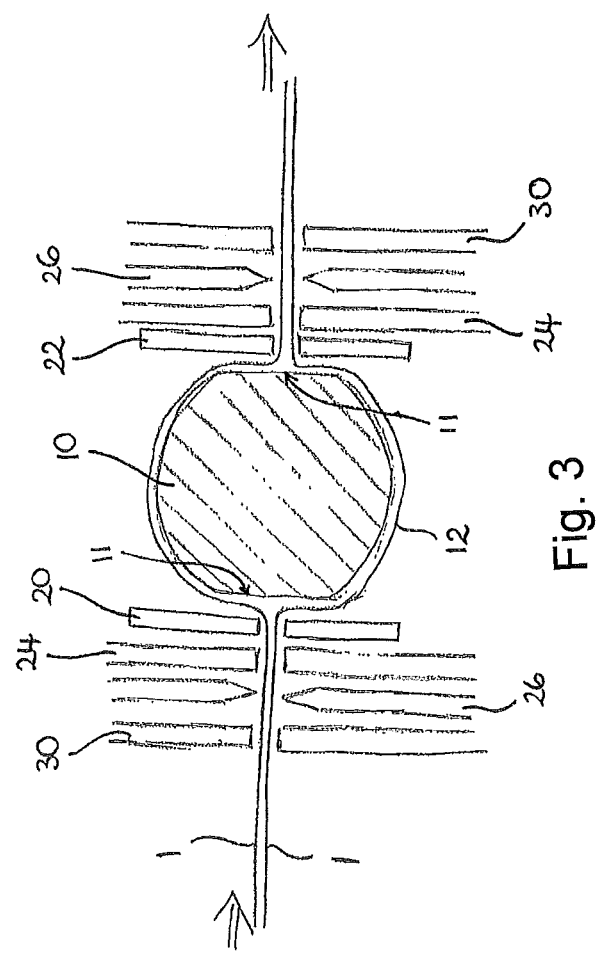
FIG. 3 illustrates the bonding and cutting means used to create a sleeve of plastics material around the former of FIG. 2.
Figure 5:
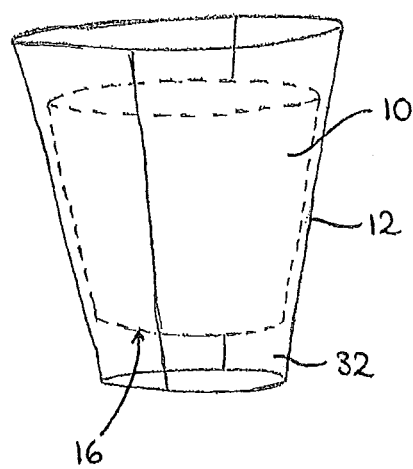
FIG. 5 shows a bonded sleeve in position around the former of FIG. 2.
Figure 6:
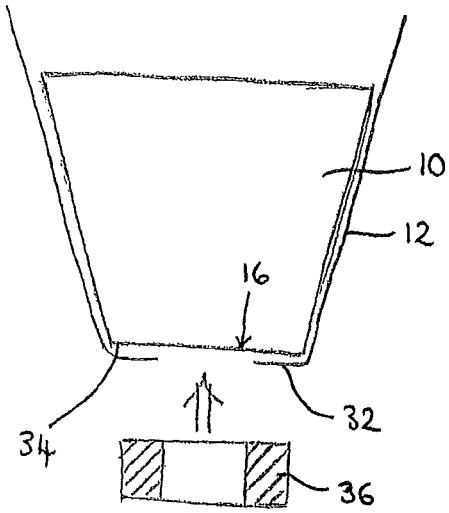
FIG. 6 illustrates heating means used to heat shrink an end portion of the sleeve of FIG. 5.

Because the first bonding means 24 are positioned radially outwards of the clamping means 20,22, if the thickness of the blade member 20,22 was not taken into account, the resultant diameter of the sleeve 12 would be greater than the diameter of the former 10. It is, therefore, desirable to provide a pair of flat surfaces 11 on opposing sides of the former 10. The position of each of the flat surfaces 11 is designed to decrease the diameter of the former 10, in that location, by an amount approximately equal to the thickness of the blade member 20,22. In the engaged position the blade members 20,22 are positioned adjacent these flat surfaces 11 and the location of the first bonding means 24 is then such that the resultant diameter of the sleeve 12 is approximately the same as the full diameter of the former 10. This is illustrated in FIG. 3.

The resultant film sleeve 12 around the former 10 has a first end region 32 that extends beyond the end face 16 of the former 10. The length of the first end region 32 of the sleeve 12 is preferably less than half the diameter of the end face 16.

In a third stage of the method, the first end region 32 of the sleeve 12 is heated to conform this region 32 around a perimeter edge 34 of the end face 16 of the former 10. Preferably a source of hot air 36 is used to heat the end of the sleeve 12, with the hot air being directed towards the end face 16 of the former 10 generally along the axis 18 of the former 10 so as to evenly heat the end region 32 of the sleeve 12 around its full circumference. Due to the orientation of the polymer chain molecules in the plastics material, the heat causes the plastics film to shrink in such a way that the end region 32 wraps around the end of the former 10 to lie in contact with the end face 16.

The heat shrunk end region 32 thereby forms a substantially flat bonding surface onto which a further piece of plastics film 38 is bonded to form a base of the lining in a fourth stage in the method. The plastics film 38 used to form the base is, preferably, the same material as the plastics film used to form the sleeve 12.

Figure 7:
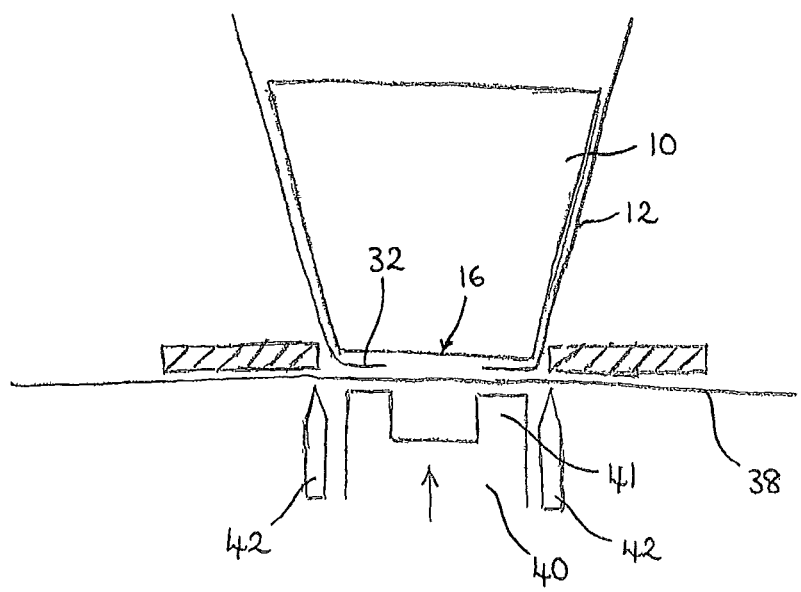
FIG. 7 illustrates the bonding and cutting means used to form a base of the lining.

As illustrated in FIG. 7, to form the base, a length of plastics film 38 is positioned adjacent to the end face 16 of the former 10. Bonding means 40 then bonds the plastics film 38 to the end region 32 of the sleeve 12 around the full perimeter of the end face 16. In this example the bonding means 40 is heat welding means that is brought into contact with the plastics film 38 such that the plastics film 38 and the edge region 32 of the sleeve 12 are sandwiched between the heat welding means 40 and the end face 16 of the former 10. The heating element 41 of the heat welding means 40 is annular and heat welds the plastics film 38 to the end region 32 of the sleeve 12 fully around the perimeter of the end face 16. Of particular importance is that the free edge of the end portion 32 of the sleeve 12 is fully bonded to the plastics film 38 so that there is no gap between this edge and the plastics film 38 forming the base of the lining.

Cutting means 42 in the form of an annular cutting blade 42 is positioned radially outwards of the heating element 40 and is arranged to cut a base portion from the plastics film 38. The cutting blade 42 is positioned so that the diameter of the base portion of the plastics film 38 is substantially equal to the diameter of the end face 16 of the former 10. The resulting base portion of the lining, therefore, has substantially the same size and shape as the end face 16 of the former 10.

In this example the base portions are cut from a continuous length of plastics film 38, and the cut is made at the same time as or shortly after the film 38 is welded to the end region 32 of the sleeve 12. In other embodiments, however, the base portions may be pre-cut and the resulting circular discs of plastics material may then be bonded to the end region 32 of the sleeve 12.

In an alternative embodiment of this method (not illustrated), a sleeve is formed around the former so that an end of the sleeve is flush with the end face of the former and there is no end region that extends beyond the end face. A base portion of the lining is cut or stamped from a sheet of plastics material so that a diameter of the base portion is greater than the diameter of the end face of the former. The base portion is then held in contact with the end face of the former and an edge region of the base portion is wrapped around the end of the sleeve by means of a retaining ring. A first heating means heats the edge region to heat shrink the edge region around the end of the sleeve and the former. A second heating means then, subsequently, heat welds the heat shrunk edge region to the sleeve. Heat shrinking the edge region before joining the base portion to the sleeve eliminates creases or folds within the edge region created when the edge region is wrapped around the end of the former.

If the edge region is not heat shrunk before it is heat welded, the creases will mean that in some regions the heat welding step is required to join two layers of plastics film, while in other regions four layers of plastics film need to be joined together. As such, if the heat welding means is designed to join only two layers of film then the regions having four layers of film will not be fully welded. Alternatively, if the heat welding means is designed to join four layers of film, then there is a high likelihood that the plastics film will melt in the regions where there are only two layers of film.

Figure 8:
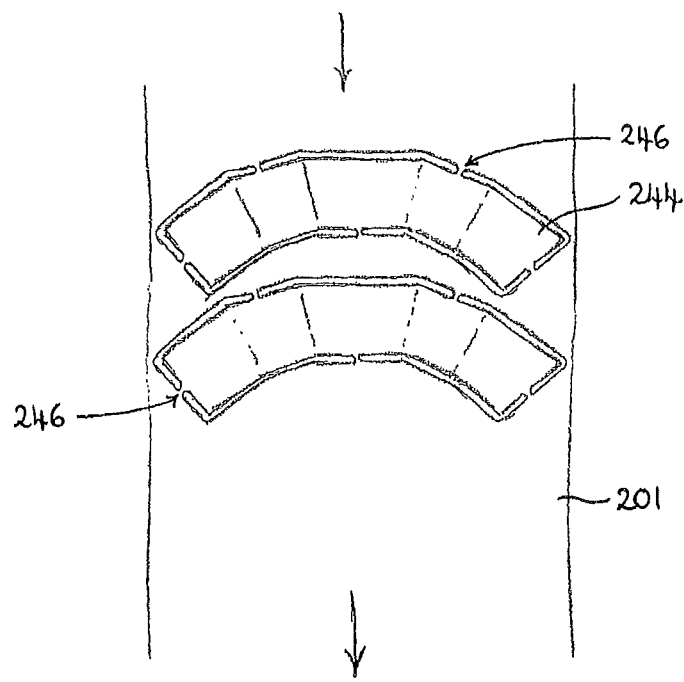
FIG. 8 illustrates a first stage in a second embodiment of a method of manufacture of a lining for a container, the lining being made from sheets of plastics material.
Figure 9:
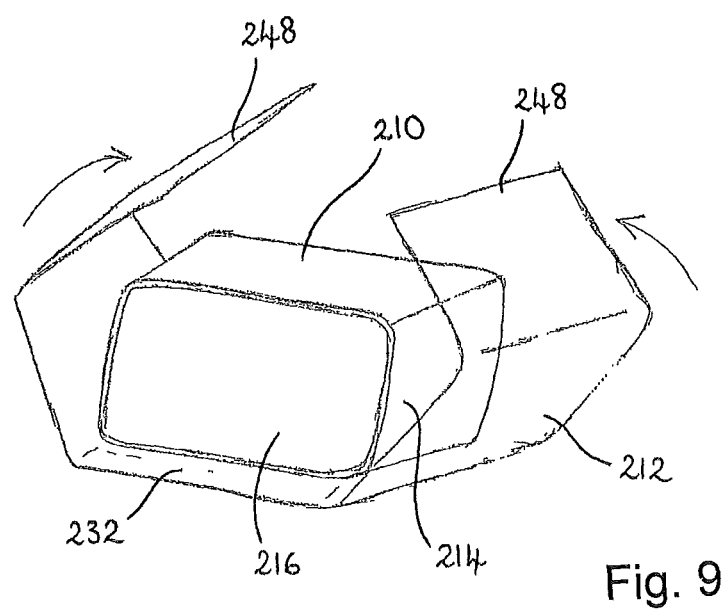
FIG. 9 shows the formation of a sleeve around a former according to the second embodiment of the method of manufacture of a lining.
Figure 10:
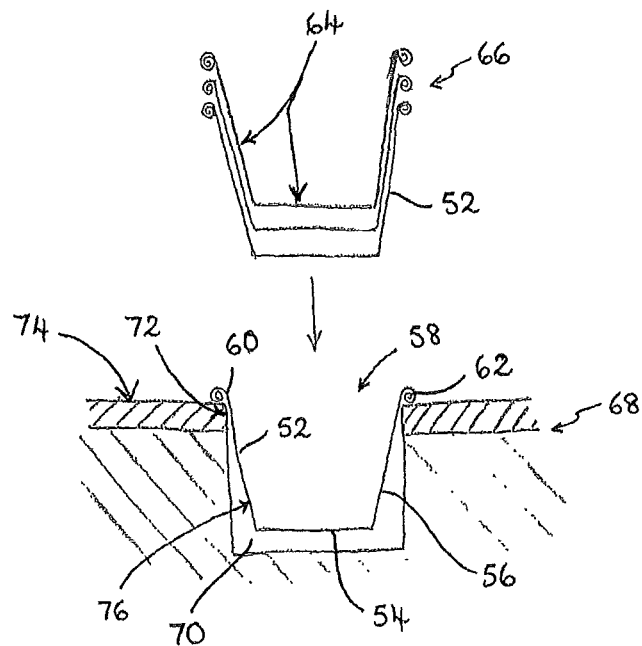
FIG. 10 illustrates a first stage in a method of lining a shell, comprising placing a single shell is a support.
Figure 11:
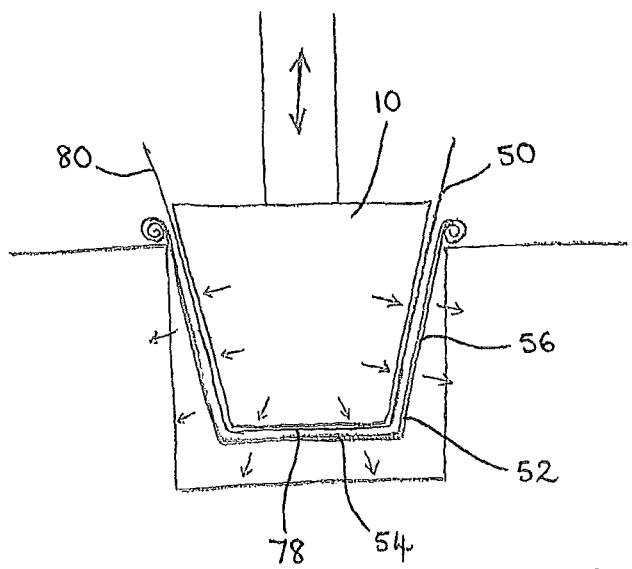
FIG. 11 shows a lining being inserted into the shell of FIG. 10.
Figure 13:
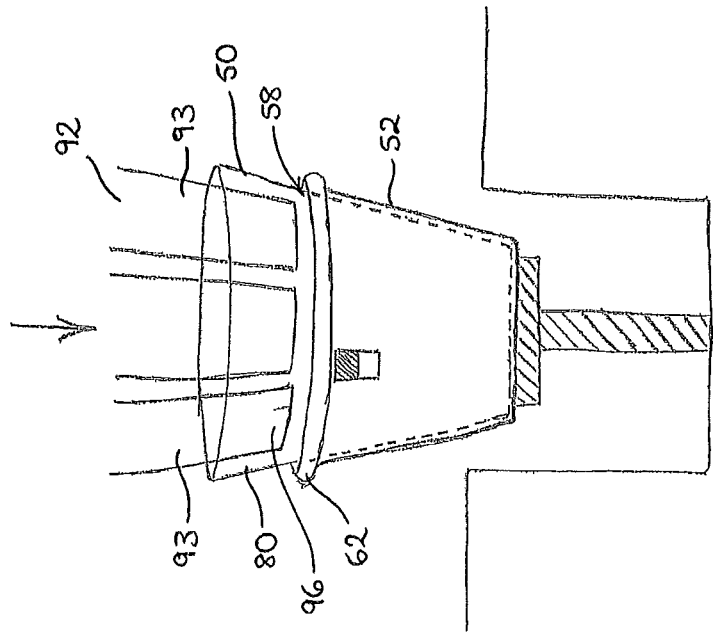
FIG. 13 illustrates a first stage in a method to wrap a part of the lining over a rim of the shell using a segmented tool according to the present invention.
Figure 12:
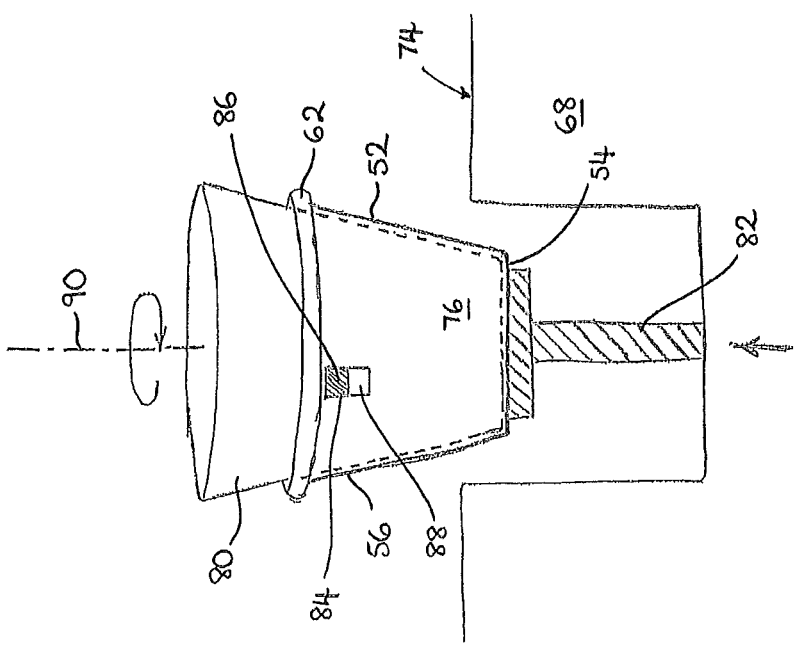
FIG. 12 illustrates the method step of adhering a tab to an external surface of the lined shell of FIG. 11.

A further embodiment of a method of manufacturing a lining of a container is illustrated in FIGS. 8 and 9.

As in the previous embodiment, the linings are formed from thin sheets or films 201 of plastics material. The films 201 are preferably continuous lengths of plastics material that are stored in rolls before use.

Each lining comprises a sleeve portion 212 and a base portion (not shown), similar to those described above in relation to the first embodiment. In this embodiment, however, each sleeve 212 is formed from a single piece of plastics film 201 that has been die cut from a continuous length of film.

The film 201 from which blanks 244 for the sleeves 212 are die cut is formed so that the polymer chains within the plastics materials are aligned generally across the width of the film. As illustrated in FIG. 8, the blanks 244 are oriented such that a width of the blanks 244 extends generally transverse to the length of the film 201.

Ideally the die cutting step does not create a continuous cut that extends fully around the blank 244. Preferably the cutting means (not shown) used to perform the die cutting includes a plurality of gaps so that, when the blank 244 is die cut, a plurality of spurs or bridges 246 of plastics material remain between the blank 244 and the surrounding waste film 201. In this way, the blank 244 remains secured to the continuous length of film 201 by means of these spurs 246.

In a subsequent step in the process, manipulating means (not shown) sever the spurs 246 and remove a blank 244 from the film 201. The blank 244 is then wrapped around a former 210, which has an external shape and external dimensions substantially the same as the internal shape and internal dimensions of the shell to be lined.

The width of the blank 244 is longer than the perimeter of the former 210 so that when the blank 244 is wrapped fully around the former 210, side edge regions 248 of the blank 244 overlap. An elongate heating element (not shown) is used to heat weld the two edge regions 248 together to form a complete sleeve 212 around the former 10.

The use of a single piece of plastics material to form the sleeve of the lining has a number of advantages over the use of two films as previously described in relation to the first embodiment. Firstly, it is only necessary to make a single weld to form the sleeve. Secondly, the tensioning and clamping mechanisms required are less complex. Thirdly, it is easier to wrap a single blank around a former having a non-circular cross-sectional shape than it is to wrap two films while maintaining the correct degree of tension in the film(s). As such, it is easier to create a liner for a shell having a generally square or rectangular cross-sectional shape, as illustrated in FIG. 9.

The resultant film sleeve 212 around the former 210 has a first end region 232 that extends beyond an end face 216 of the former 210. This end region 232 is then heat shrunk to form a substantially flat bonding surface, and a base attached to the sleeve 212, as previously described in relation to the first embodiment.

In an alternative embodiment, the film 201 from which the blanks 244 are die cut is formed so that the polymer chains within the plastics materials are aligned generally along the length of the film. The blanks 244 are then oriented such that a width of the blanks 244 extends generally along the length of the film 201. In this way the width of the blanks 244 remains generally parallel to the direction of orientation of the polymer chains.

In all of the embodiments described above, it is preferable if the former 10, 210 additionally includes air passages (not shown) which extend between holes in the side wall of the former 10, 210 and a pump. The pump is used, in a first mode of operation, to draw air into the passages from around the outside of the former and, in a second mode of operation, to blow air out through the holes in the side wall. While the sleeve 12, 212 is being formed around the former 10, 210, the pump is operated in its first mode so that the film is drawn and held around the side wall 14, 214 of the former 10, 210 by means of a partial vacuum created between the former 10, 210 and the plastics film.

The resultant lining that is formed by any of the above-described methods comprises a side wall, formed by the sleeve of plastics film, and a base. In some embodiments the height of the side wall of the lining is greater than the height of a side wall of the shell to be lined. The purpose of this additional section of lining is described further below in relation to a method of lining a shell.

Method of Lining a Shell

In this part of the process, a lining 50 that has been pre-formed using one of the methods described above is inserted into and adhered to an outer shell 52 to form a complete container 119 according to the present invention.

The shell 52 is made from paperboard and, in this example, is in the form of a paper cup 52 which has been made in the usual way as is well known in the art. The shell 52 comprises a generally circular base 54, a side wall 56 extending from the base and an opening 58 defined by an upper edge 60 of the side wall 56. The upper edge 60 of the side wall 56 includes a rolled rim 62 that extends fully around the opening 58.

The shell 52 has an adhesive pre-applied to the internal surfaces 64 of the base 54 and side wall 56, for adhering the lining 50 to the shell 52. The adhesive is an activated adhesive such that the adhesive is inactive and not tacky during storage before the linings 50 are inserted and when the lining 50 is inserted into the shell 52, and the adhesive is subsequently activated to become tacky once the lining 50 is in the correct position in the shell 52. In this preferred embodiment, the adhesive is a heat activated adhesive; however, in other embodiments the adhesive may be activated by pressure or UV light, or a combination of conditions. The adhesive may be sprayed into the formed cup 52 or alternatively, and preferably, the paperboard is pre-coated with the adhesive before the cup 52 is formed.

The adhesive has a low peel strength but a moderate shear strength, similar to the adhesive used on Post-It™ Notes. The moderate shear strength of the adhesive means that the lining will remain stuck to the internal surface of the shell during use of the container. Also, as a number of containers will typically be nested during transportation or storage, it is important that, when the containers are separated from each other, the lining does not get pulled away from the outer shell. However, the low peel strength means that minimal force is required to peel the lining away from the shell after use, in order to dispose of and recycle the lining and the paperboard shell separately. The peel strength should be low enough that it is relatively easy for both younger children and the elderly to manually separate the lining and the shell. Preferably the peel strength of the adhesive use to bond the lining to the shell is less than 0.05 N, and more preferably between 0.02 N and 0.04 N.

The shells 52 are pre-printed with any desired graphics or text on either or both of the internal and external surfaces of the shell. This may include images and information about the intended contents of the container, and information about how to dispose of and recycle the parts of the container after use, as described further below.

A plurality of small holes (not shown) are formed around the periphery of the base 54 of the shell 52. These holes are made as small as possible, but of a suitable size to enable air to be drawn through the shell 52. In other embodiments, holes may be formed, additionally or alternatively, in the side wall 56 of the shell 52 proximate a lower end of the side wall near the base 54.

A plurality of shells 52 to be lined are held in a stack 66 before processing. In a first step in the method, a single shell 52 is removed, or de-nested, from the stack 66, using any suitable means. The shell 52 is seated in a support 68 comprising a recess 70 sized to receive at least a lower portion of the shell 52. The diameter of an opening 72 of the recess 70 is the same as the external diameter of the shell 52 just below its rim 62. As such, when a shell 52 is placed in the support 68, the rim 62 of the shell 52 is seated on an upper surface 74 of the support 68 and the lower portion of the shell 52 is suspended within the recess 70. The dimensions of the recess 70 are such that there is a gap between external surfaces 76 of the shell 52 and the surfaces of the recess 70 and the support further includes means for applying a partial vacuum around the outside of the shell 52.

In a second step of the method of lining the paperboard shell, the pre-formed lining 50 described above, still retained around the former 10, 210 by means of a partial vacuum, is inserted into the shell 52. The former 10, 210 is fully inserted so that the base 78 of the lining 50 is in contact with the internal surface 64 of the base 54 of the shell 52. With the lining 50 inserted in this way an upper edge region 80 of the lining 50, corresponding to a second end region of the sleeve 12, 212, protrudes from the opening 58 of the shell 52.

The partial vacuum applied to the lining 50 around the former 10, 210 is then turned off and a partial vacuum is applied to the outside of the shell 52. Due to the holes formed in the base 54 of the shell 52, a lower portion of the lining 50 is drawn tightly into the lower edge region of the shell 52 where the base 54 meets the side wall 56. Subsequently, the pump connected to the former 10, 110 is switched to its second mode of operation such that air is blown out through the holes in the side wall of the former 10, 210. This causes the lining 50 to be blown outwards away from the former 10, 210 and into contact with the side wall 56 of the shell 52. This has the dual advantages of pressing the lining 50 against the internal surfaces 64 of the shell 52 and blowing the lining 50 away from the former 10, 210 so that the former 10, 210 can be withdrawn from the shell 52 without dragging on the lining 50.

With the partial vacuum continuing to be applied around the outside of the shell 52, a heated tool (not shown) is inserted into the lined shell 52. The heated tool is substantially identical in shape to the former 10, 210, and has an external shape and external dimensions substantially the same as the internal shape and internal dimensions of the lined shell 52.

The heated tool heats the adhesive to a temperature at which the adhesive is activated and becomes tacky, to adhere the lining 50 to the internal surfaces 64 of the shell 52. The temperature of the heated tool is such that the adhesive is raised above its activation temperature but the integrity of the plastics material of the lining 50 is not affected. In a preferred embodiment, the heated tool remains at a constant temperature, is inserted quickly into the lined shell 52, is held in position just long enough for the adhesive to become tacky and is then withdrawn quickly.

Once the lining 50 has been adhered to the shell 52, the partial vacuum around the shell 52 is removed. The lined shell 52 is then raised out of the support 68 so that at least an upper region of the side wall 56 is held above the upper surface 74 of the support 68. The shell 52 may be raised using any suitable means, but in a preferred embodiment the shell 52 is raised by means of a follower 82, in engagement with a can surface (not shown), that acts on the base 54 of the shell 52. In other embodiments the shell 52 may be raised using a piston or ram.

A fourth step in the method comprises adhering a tab 84 to an external surface 76 of the shell 52. The tab 84 consists of a substantially rectangular piece of paper or plastics sheet having adhesive applied to a part of a first surface of the sheet. In other embodiments the tab may be any suitable shape. In a preferred embodiment, a first part 86 of the first surface is coated with adhesive and a second part 88 of the first surface is uncoated. The adhesive is chosen such that the tab 84 can, subsequently, be easily peeled away from the external surface 76 of the shell 52. The tab 84 is adhered to the side wall 56 of the shell 52 such that the first surface of the tab 84 is in contact with the shell 52 and the adhesive part 86 of the tab 84 is closer to the rim 62 of the shell 52 than the non-adhesive part 88. In this example the tab 84 is adhered at the top of the side wall 56 of the shell 52 so that the tab 84 is positioned directly below the rim 62.

For consistency in the manufacturing process, it is desirable if the tab 84 is adhered to the shell 52 in exactly the same place each time the method is carried out. This is especially important if the shell 52 is pre-printed with graphics as described above. The shell 52 will, however, typically be randomly orientated when a single shell 52 is removed from the stack 66 and seated in the support 68. Means are, therefore, provided to rotate the shell 52 and to detect the orientation of the shell 52 about its axis 90. To achieve this, an identifying marker or graphic (not shown) is pre-printed onto the external surface 76 of the shell 52, and an appropriate optical sensor (not shown) is used to detect this marker as the shell 52 is rotated. Once the marker has been detected, the shell 52 is rotated through a pre-set angle, which may be zero. The tab 84 is then adhered to the shell 52 in the desired location.

In a preferred embodiment, a part of a second, outward facing surface of the tab 84 is also coated with an adhesive. When the tab 84 is adhered to the shell 52, this adhesive part of the second surface of the tab 84 is closer to the rim 62 of the shell 52 than the non-adhesive part. In some embodiments of the method, the adhesive applied to the second surface of the tab 84 may be an activated adhesive, and may be a pressure activated adhesive or a heat activated adhesive.

With the shell 52 still in the raised position relative to the support 68, the next step in the method is to draw the upper edge region 80 of the lining 50 down over the rim 62 of the shell 52 so that this upper region 80 of the lining 50 extends down the external surface 76 of the side wall 56 of the shell 52.

Figure 15:
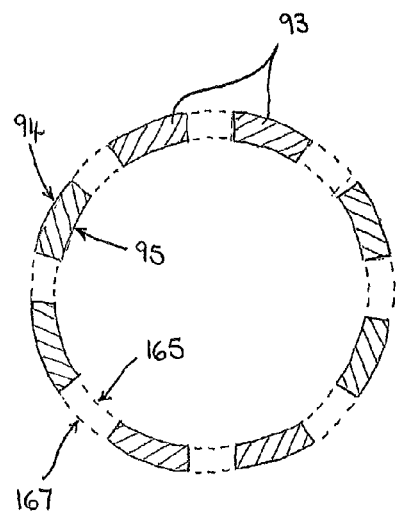
FIG. 15 is a cross-sectional view of one embodiment of the segmented tool illustrating the inner and outer perimeters of the tool.

An expandable tool 92 comprises a plurality of fingers or petals 93 in an annular arrangement. Each of the petals 93 has a radially outer surface 94 and a radially inner surface 95, each of the outer and inner surfaces 94, 95 extending between sides of the petal 93. The radially inner surfaces 95 define an inner perimeter 165 of the tool 92 and the radially outer surfaces 94 define an outer perimeter 167 of the tool 92, as illustrated in FIG. 15. In this example the tool 92 has six petals 93; however, in other embodiments the tool 92 may have any suitable number of petals 93. The tool 92 may only comprise two semi-annular petals 93.

The petals 93 are movable from a first, collapsed configuration in which the tool 92 has a first, smaller diameter to a second, expanded configuration in which the tool 92 has a second, larger diameter. In a preferred embodiment, when the tool 92 is in its collapsed configuration the petals 93 are in side to side touching contact with each other and when the tool 92 is in its expanded configuration the petals 93 are spaced equidistantly apart from each other.

In its collapsed configuration an external diameter of the tool 92, defined by the radially outer surfaces 94 of the petals 93, is less than the diameter of the opening 58 of the shell 52 and, in particular, is less than the internal diameter of the upper edge region 80 of the lining 50. In its expanded configuration an internal diameter of the tool 92, defined by the radially inner surfaces 95 of the petals 93, is greater than the outer diameter of the rim 62 of the shell 52.

Figure 14:
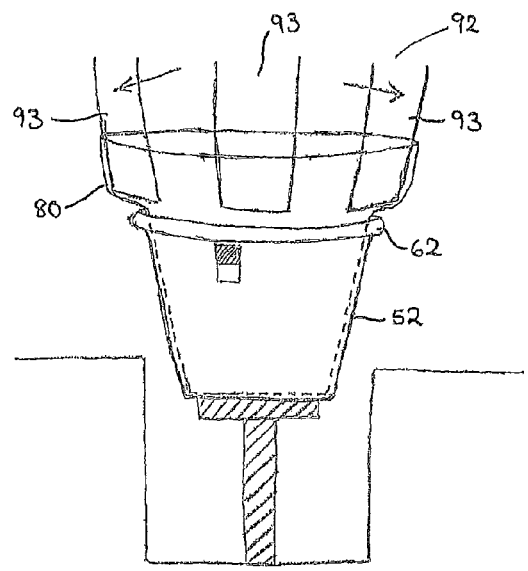
FIG. 14 illustrates a second stage in the method to wrap a part of the lining over a rim of the shell.

The tool 92, in its collapsed configuration, is positioned such that a tip or end portion 96 of the petals 93 is within the upper edge region 80 of the lining 50 and above the rim 62 of the shell 52. The tool 92 is then expanded so that the radially outer surfaces 94 of the petals 93 are brought into contact with the inwardly facing surface of the upper edge region 80 of the lining 50. The tool 92 continues to expand so that the upper region 80 of the lining 50 is stretched radially outwards. The lining 50 is stretched until the diameter of the upper edge region 80 is greater than the external diameter of the rim 62 of the shell 52, as shown in FIG. 14.

Figure 16:
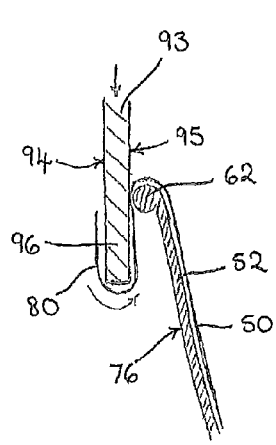
FIG. 16 is a detailed view of a part of the segmented tool, illustrating how the lining is wrapped over the rim.
Figure 17:
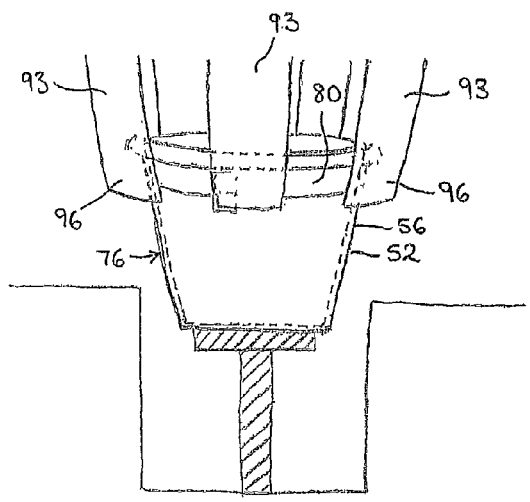
FIG. 17 illustrates a further stage in the method to wrap a part of the lining over a rim of the shell.
Figure 18:
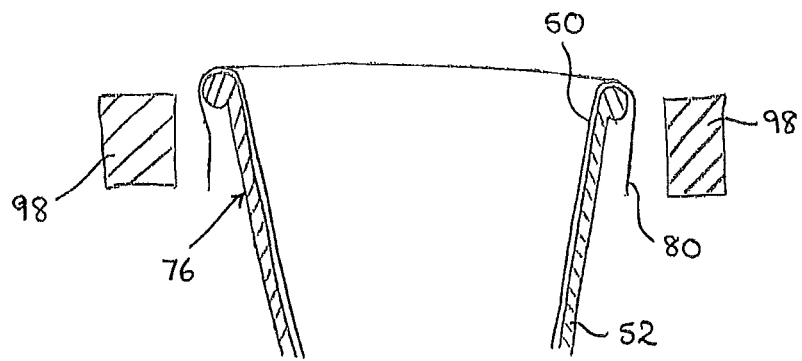
FIG. 18 illustrates means for shrink wrapping a part of the lining around the external surface of the shell.
Figure 19:
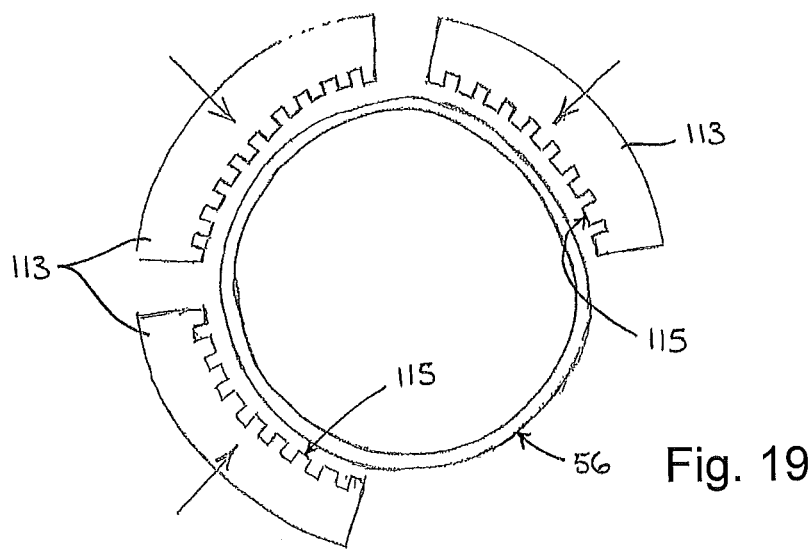
FIG. 19 illustrates perforating blades used to form a line of perforations in the shrink wrapped part of the lining.
Figure 20:
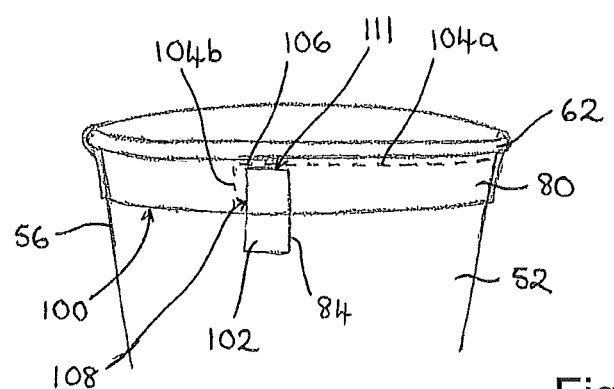
FIG. 20 shows an upper portion of a finished container comprising a shell and a lining according to the present invention.

Once the tool 92 has fully expanded, the tool 92 is moved so that the ends 96 of the petals 93 pass around the outside of the shell 52. As the tool 92 is lowered, the upper region 80 of the lining 50 slides down along the radially outer surfaces 94 of the petals 93 and is drawn around and under the ends or tips 96 of the petals 93, so that the upper region 80 of the lining 50 extends down over an upper portion of the external surface 76 of the side wall 56 of the shell 52, as illustrated in FIGS. 16 and 17.

Once the upper region 80 of the lining 50 has been drawn fully from around the outside of the tool 92, so that the upper region 80 of the lining 50 lies adjacent to the external surface 76 of the shell 52, the tool 92 is raised back to a position above the shell 52.

Although in the presently described embodiment the tool 92 comprises a plurality of distinct petals 93, in other embodiments the tool 92 may comprise an expandable ring. In these embodiments the tool 92 may comprise a coiled member in which, in a collapsed configuration, end regions of the member overlap to form a ring of a first, smaller diameter and, in an expanded configuration, the end regions of the member do not overlap or overlap to a lesser degree to form a ring of a second, larger diameter.

In embodiments in which a part of the second surface of the tab 84 is coated with an adhesive, as the upper region 80 of the lining 50 is drawn down the side wall 56 of the shell 52, the lining contacts 50 the adhesive part of the tab 84. If the adhesive is tacky, the lining 50 will adhere to the tab 84 on contact. If, however, the adhesive is an activated adhesive a further processing step is required to adhere the lining 50 to the tab 84. In this example, the adhesive is a heat activated adhesive and adherence occurs during subsequent heating of the upper region 80 of the lining 50 described below.

To firmly secure the upper region 80 of the lining 50 to the shell 52, this region is heat shrunk around the external surface 76 of the shell 52. A heating element 98 applies a curtain of hot air around the outside of the shell 52 to heat shrink the lining 50 around the shell 52. The heating element 98 is annular and has an internal diameter greater than the outer diameter of the rim 62 of the shell 52. The heating element 98 is lowered around the upper portion of the shell 52, and hot air emitted by the heating element 98 is directed onto the upper region 80 of the lining 50 to heat shrink the lining 50 around the rim 62 and the side wall 56 of the shell 52.

As the lining 50 is heated, the heat activated adhesive applied to the tab 84 is activated and becomes tacky. The lining 50 is, therefore, adhered to this part of the tab 84 during the heat shrinking process. In other embodiments it may be beneficial to heat weld the upper region 80 of the lining 50 to the tab 84.

The dimensions of the tab 84, the position of the tab 84 on the shell 52, and the depth of the upper region 80 of the lining 50 are such that, following heat shrinking of the lining 50, the upper region 80 of the lining 50 covers an upper part of the tab 84. A lower portion of the tab 84, which is not adhered to the shell 52, protrudes below the edge 100 of the lining 50. This part of the tab 84 forms a grip portion 102 that a user can grip to aid in the separation of lining 50 and shell 52 as described below.

In a final step in the method, perforations 104 are formed in the upper region 80 of the lining 50 to enable the lining 50 to be removed from the shell 52. Because the upper region 80 of the lining 50 has been heat shrunk around the side wall 56 of the shell 52, it is not possible to simply fold the upper region 80 of the lining 50 back over the rim 62 of the shell 52 to peel the lining 50 away from the shell 52. As such, it is necessary for a user to tear the upper region 80 of the lining 50 in order to release it from the side wall 56 of the shell 52 before the rest of the lining 50 can be peeled away from the internal surfaces 64 of the shell 52.

To aid the user, at least one region of weakness is provided in the upper region 80 of the lining 50, which in this embodiment is a line of perforations 104. In other embodiments the region of weakness may include a nick or cut made in the edge of the upper region 80 of the lining 50. The perforations 104 extend through the lining 50 but not through the underlying side wall 56 of the shell 52. A first line of perforations 104a extends circumferentially around the shell 52. In this embodiment the line of perforations 104a extends about two-thirds of the way around the shell 52 and is located close to the rim 62 of the shell 52. A second line of perforations 104b extends between a first end 106 of the first line of perforations 104a and the edge 100 of the upper region 80 of the lining 50. The second line of perforations 104b and the first end 106 of the first line of perforations 104a are positioned such that the second line of perforations 104b extends adjacent to a side edge 108 of the tab 84 and the first end 106 of the first line of perforations 104a extends between an upper edge 111 of the tab 84 and the rim 62 of the shell 52.

To create the first line of perforations 104a, three perforating blades 113 are arranged in a single plane around the outside of the container 119. Each of the blades 113 includes a concave castellated cutting edge 115. The blades 113 are movable between a disengaged position, in which the blades 113 are spaced apart and at a distance from the side wall 56 of the container, and an engaged position, in which the cutting edges 115 of the blades 113 pierce the upper region 80 of the lining 50. In the engaged position the perforating blades 113 are positioned such that the three cutting edges 115 are contiguous so as to cut a continuous line of perforations 104. The curvature of each of the cutting edges 115 is, therefore, substantially the same as the curvature of the external surface 76 of the side wall 56 of the shell 52. The lengths of the three cutting edges 115 are such that the resulting line of perforations 104 extends about two thirds of the way around the container.

The second line of perforations 104b is cut using a straight perforating blade (not shown) having a castellated cutting edge. The perforating blade is movable between a disengaged position, in which the blade is spaced at a distance from the side wall 56 of the container, and an engaged position, in which the cutting edge of the blade pierces the upper region 80 of the lining 50. The length of this perforating blade is designed so that the second line of perforations 104*b* extends only between the first line of perforations 104*a* and the edge 100 of the lining 50.

The tab 84 and perforations 104 are thereby provided so that, when the container is empty and a user wishes to separate the lining 50 and shell 52 for disposal and recycling, the user can grip the free part 102 of the tab 84 and tear the lining 50 firstly along the second line of perforations 104*b* and then, secondly, along the first line of perforations 104*a*. This separates the majority of the upper region 80 of the lining 50 from the side wall 56 of the shell 52 and allows the remaining part of the upper region 80 of the lining 50 to be folded back over the rim 62 of the shell 52. By continuing to pull on the tab 84 and the now separated upper region 80 of the lining 50, the remainder of the lining 50 can be peeled apart from the internal surfaces 64 of the shell 52.

Once the perforations 104 have been formed, the completed containers 119 are stacked together for storage and transportation. Alternatively, the containers 119 may be conveyed directly to a further machine which fills and seals the containers.

In some embodiments of the containers 119, at least a part of the plastics lining 50 is opaque. Corresponding regions of the shell 52, which are covered with the opaque parts of the lining 50 during manufacture of the container 119, are printed with a coloured region or text, for example "100% CARD". While the lining 50 is adhered to the shell 52, the coloured region or text is concealed beneath the opaque lining 50. When the lining 50 is removed from the shell 52 for disposal and/or recycling, the coloured regions or text are visible. In this way, it is easy to ascertain whether the lining 50 has been separated from the shell 52. This is of particular importance in recycling facilities where it is beneficial to be able to visually identify that the lining 50 has been peeled from the shell 52 so that the remaining shell 52 is 100% paperboard. The opaque parts of the lining 50 may be formed by printing on the lining 50.

An apparatus used to carry out the methods described hereinbefore preferably comprises a first sub-assembly for implementing the method steps associated with forming the lining, and a second sub-assembly for implementing the method steps associated with securing and conforming the pre-formed lining to an outer shell to form a complete container. The first and second sub-assemblies are arranged to co-operate with each other so that a lining manufactured using the first sub-assembly is transferred into a shell retained in the second sub-assembly. The sub-assemblies are designed to operate continuously so that the desired rate of output of the containers is achieved to make this method of manufacture commercially feasible for items such as coffee cups, yogurt pots, ice cream tubs and similar containers.

The present invention, therefore, provides an improved method for manufacturing a container having a separable inner lining and outer shell, together with the apparatus for manufacturing such a container.

The invention claimed is:

1. A method of forming a flexible lining for a container, the method comprising:
    providing a former having a substantially flat end face and a perimeter surface extending from the end face, the former having external shape and dimensions substantially the same as the internal shape and dimensions of said container;
    forming a sleeve of a thin sheet or film of plastics material around the perimeter surface of the former, an edge region of the sleeve extending beyond the end face of the former;
    heating said edge region to substantially conform the edge region to an edge portion of the end face of the former; and
    bonding a sheet of plastics material to said conformed edge region of the sleeve to form a base of the lining, the lining being non self supporting and subsequently conforming exactly to the internal shape of a container to be lined.

2. The method of claim 1, wherein the step of forming a sleeve comprises:
    wrapping a first sheet of plastics material around a first part of the perimeter surface of the former;
    wrapping a second sheet of plastics material around a second part of the perimeter surface of the former; and
    bonding the first and second sheets together to form a sleeve around the perimeter surface of the former.

3. The method of claim 2, wherein the method further comprises, after bonding the first and second sheets together to form a sleeve, the step of cutting the first and second sheets of plastics material adjacent to said bond to remove excess plastics material from the sleeve.

4. The method of claim 1, wherein the method comprises:
    cutting a blank from a sheet of plastics material;
    wrapping said blank around the perimeter surface of the former so that edges of the blank overlap; and
    bonding said overlapping edges to form the sleeve around the former.

5. The method of claim 4, wherein the step of cutting the blank comprises die cutting said blank.

6. The method of claim 1, wherein the step of bonding a sheet of plastics material to the conformed edge region comprises heat welding said sheet of plastics material.

7. The method of claim 1, wherein the method further comprises, after the step of bonding a sheet of plastics material to the conformed edge region of the sleeve, cutting said sheet so that a perimeter shape of the sheet is substantially the same as a perimeter shape of the end face of the former.

8. An apparatus for forming a flexible, non self supporting lining for a container, the apparatus comprising:
    a former around which the non self supporting lining is formed, the former having a substantially flat end face and a perimeter surface extending from the end face, and the former having external shape and dimensions substantially the same as the internal shape and dimensions of said container;
    means for forming a thin sheet or film of plastics material around the perimeter surface of the former, to form a sleeve around the former, an edge region of the sleeve extending beyond the end face of the former;
    heating means arranged to heat said edge region to substantially conform it to an edge portion of the end face of the former; and
    bonding means arranged to bond a sheet of plastics material to said conformed edge region of the sleeve to form a base of the lining.

9. The apparatus of claim 8, wherein the means for forming a sheet of plastics material around the perimeter surface of the former comprises:
    cutting means for cutting a blank from a film of plastics material;

manipulating means for wrapping said blank around the perimeter surface of the former so that edges of the blank overlap; and bonding means for bonding said overlapping edges to form the sleeve around the former.

10. The apparatus of claim 8, wherein the bonding means for bonding a sheet of plastics material to said conformed edge region of the sleeve comprises heat welding means.

11. The apparatus of claim 8, the apparatus further comprising cutting means for cutting said sheet of plastics material to form a base of the lining, the cutting means arranged, in use, to cut said sheet so that a perimeter shape of the sheet is substantially the same as a perimeter shape of the end face of the former.

* * * * *